Patented Oct. 1, 1946

UNITED STATES PATENT OFFICE 2,408,647

MANUFACTURE OF HYDRATED LIME

Harry N. Huntzicker, Evanston, and Charles Robert Norman, Jr., Chicago, Ill., assignors to United States Gypsum Company, Chicago, Ill., a corporation of Illinois No Drawing. Application March 13, 1941, Serial No. 383,170

8 Claims. (Cl. 23—188)

The present invention relates to an improved process for converting limestone into hydrated lime.

One of the primary objects of the invention is to enable the production of a superior form of plastic hydrated lime from various kinds of limestone, whether they be of the high calcium or of the dolomitic type, by burning or calcining such limestone under conditions which make it possible to effect the calcination without the necessity of careful selection or grading of the various sizes of limestone that are treated and enables the calcination to be carried out under such conditions that even the largest pieces of the stone being calcined will be completely burned; that is to say, all the carbon dioxide therein contained will be removed. The fact that this will invariably result in the overcalcination or overburning of the smaller stones as well as the exterior portion of the larger stones become of no particular importance, because this condition is rectified by the further steps in the process of the present invention.

A further object of the invention is to hydrate the entire output of the calcining step under such conditions as to assure substantially complete hydration of all of the alkaline earth oxides therein contained, including magnesium oxide and any calcium oxide which as the result of overburning becomes difficult to hydrate. The hydration of the more difficultly hydratable portions of the calcined product is effected under superatmospheric pressure, being further aided, if desired, by the utilization of certain hydration accelerating compounds or salts.

A further object of the invention is to accelerate the hydration of difficultly hydratable alkaline earth oxides under pressure by the use of hydration accelerating agents, such as either ammonia or ammonium salts or compounds which increase the solubility of the oxides.

A still further object of the invention is to provide a method of calcining, hydrating and further treating limestone containing magnesia, so as to insure the final production, by economical and easily controlled operations, of a hydrated lime product which is superior to that hitherto made, being characterized by substantial freedom from failure when used in commercial operations and particularly from such failures as may result from the eventual hydration of any unhydrated magnesium oxide which is ordinarily contained in magnesian limes of the prior art, it being well known that the presence of magnesium oxide will lead to eventual hydration on the job, with resulting expansion, strain, cracking, and other failure of the applied finishing lime.

The essential features of the present invention therefore may be summarized as comprising the overcalcination of limestone—which may be pure limestone, magnesian limestone, dolomitic limestone, and even limestone containing up to 25% of impurities, such as clay, silicates, etc.—to an extent which insures the complete removal therefrom of all the therein contained carbon dioxide, the subsequent hydration thereof under conditions which insure the complete hydration of all the alkaline earth oxide produced (in which it is intended to include the magnesium compounds), and the eventual ball milling of the product to produce reagglomeration of the fine particles so as to control the desired plasticity of the product and to give it the desired soaking properties. As an intermediate step between the hydration and the ball milling, there is preferably a step of removing any excess water which might have been added during the hydrating step, as it has been found very desirable to conduct the ball milling in the absence of any excess moisture.

The prior art methods of hydrating dolomitic lime comprised the mixing of water and lime under ordinary atmospheric pressure in commercial hydrating devices such as the Clyde, Kritzer, or Schaffer hydrators. In these devices ordinary calcium oxide hydrates readily, but magnesium oxide is hydrated to only a slight extent; in fact, in most commercially available dolomitic lime hydrates the amount of magnesium oxide which has been hydrated to magnesium hydroxide rarely exceeds 5%. In contrast, the product produced by the present invention contains a very large percentage of hydrated magnesium oxide, provided of course that a dolomitic or magnesian limestone has been used as the raw material.

When dolomitic limestone is calcined sufficiently to insure the calcination of all the therein contained calcium carbonate, thereby converting it into CaO, the magnesium carbonate, which decomposes more readily, is converted into a form of MgO which is relatively difficult to hydrate or at least is so inactive that it will not react with water to any great extent in a slaking operation which will readily hydrate ordinary calcium oxide. This would be no particular disadvantage if it were not for the fact that even the difficultly hydratable MgO is not really inert but, if given sufficient time, will eventually hydrate. Thus when lime containing such a type of MgO is used, for example, as a finishing lime or as a mortar, it will eventually become hydrated, particularly under humid conditions. Inasmuch as hydration of MgO to $Mg(OH)_2$ is accompanied by expansion, it is obvious that difficulties are bound to arise. Thus, for example, in a white coat plaster mixture or mortar containing such MgO there will be eventual expansion or failure of the plaster or mortar, etc.

It is already known that dolomitic lime may be slaked under conditions producing a bed of putty, which of course is hot as a result of the heat of reaction which accompanies the hydration of the calcium oxide; and if such a bed of putty is allowed to remain warm, the magnesium oxide may eventually become hydrated in a period of from 24 to 48 hours or more. However, in manufacturing commercial, dry, hydrated lime the calcium oxide in the lime will be readily hydrated in a short time; and as such lime is usually packed as soon as it comes from the hydrator, it usually conforms to a composition which approximates $Ca(OH)_2MgO$. If such a product is subsequently soaked by the user to make a putty, usually by the addition of cold water, a suspension or putty of calcium hydroxide will result, but this will contain unchanged MgO. Inasmuch as most of the dolomitic lime of commerce is sold in the form of a lime hydrate, this condition assumes considerable importance; and it is one of the objects of the present invention to overcome this deficiency.

Also, in the prior art, as hitherto carried out in the manufacture of lime, particularly hydrated lime, it was found necessary and desirable carefully to select the size of the stone which was to be burned and so to control the heating or calcining step as to secure the proper calcination without, however, the production of overburned portions, which in the past had been found difficult subsequently to hydrate to the hydroxide. This usually resulted in the formation of certain amounts of unburned core, which had to be removed from the calcined product by crushing and sifting, the lime being somewhat softer than the unburned core, thereby permitting its separation. For that reason it was considered good practice in the prior art to burn limestone in kilns, the sizes of the stones being so adjusted that the diameter of the largest stone was not much over twice that of the smaller stone. Of course, in such plants where the lime was calcined merely for agricultural purposes, such careful selection was not necessary; but when manufacturing high grade finishing lime the selection of stone size was highly desirable. Thus, in operating under ideal conditions, the sizes of stones used might have been in the range between 5 and 10 inches or 6 and 12 inches in diameter, the stone usually being calcined to the point where the smaller stone was just burned through, without a core, however leaving cores of unburned stone in the center of the larger stone. This therefore required selection of the calcined material and removal of the cores by hand or otherwise. At the same time, any overburned material had to be discarded.

In practicing the present invention, however, it is possible for all of the stone to be burned to "no core" even though thereby some overburned product will result, and the entire output of the kiln is converted into finishing lime or other suitable forms of hydrated lime.

In accordance with the present invention, all of the stone taken from a limestone or dolomite deposit is employed for the manufacture of a high grade finishing lime or similar products for use where high degree of plasticity and good working quality are required. It therefore becomes possible to eliminate the costly sorting of the lime kiln discharge and the disposal of unused material. Furthermore, by the process of hydration employed, the product is completely hydrated, which will result in a lime which is free from unsoundness and which will not "pop" when used as a finishing lime.

In carrying out the process of the present invention in a shaft kiln, the following method of operating has been found to yield satisfactory results: The shaft kiln may be operated with stone between 5 and 10 inches in diameter, and all of the stone may be burned to a condition of "no core." The entire output of the kiln, after cooling, is crushed to a fineness sufficient to pass about a 4-mesh screen and is then hydrated at atmospheric pressure in any of the well-known types of commercial hydrators—for example, a Schaffer hydrator. This will hydrate the normally burned oxides of the alkaline earths present in the product, but will not hydrate the overburned portions, and but a small amount of the magnesium oxide. The output of the hydrator is then further hydrated under steam pressure so as to effect the hydration of the overburned portions of calcium oxide, and most of the magnesium oxide as well.

A typical illustration of the process is given below:

A batch of suitable size—for example, one ton—of dolomitic hydrate as normally produced $(Ca(OH)_2MgO)$ is placed in an autoclave and mixed with just sufficient water to satisfy the hydration requirements of the MgO. This may vary, depending on the constitution of the original lime and the amount of MgO already hydrated in the normal hydration operation, and some allowance should be made for water added as steam. For a typical dolomite the amount of water mixed with the ton batch of hydrate should be from 250 to 300 pounds, the small theoretically remaining portion being obtained from the steam added. The addition of steam is necessary to initiate the reaction, and from the standpoint of economy should be kept at a minimum. After the water and the hydrate are well mixed, steam is admitted to the autoclave and the pressure brought up to 50 pounds per square inch in as short a time as possible. The steam is shut off as soon as the 50 pounds pressure is reached. From then on the reaction between the MgO and water supports itself, and the pressure may rise to 150 or 200 pounds per square inch. Completion of the action is indicated by a drop in pressure after reaching the maximum. A check on the completion of the reaction can be made by the addition of a further amount of water—say, 15 to 20 pounds; and if there is still some MgO present, there will be another surge of pressure; otherwise, if the hydration is complete, the addition of water merely increases the rate of pressure drop. When the hydration is completed, the steam is discharged from the autoclave as rapidly as possible, say, in from 5 to 10 minutes, the agitator in the autoclave being operated so as to facilitate the elimination of the steam and moisture. Obviously, complete drying in the autoclave cannot be obtained. However, as it is desirable to remove any excess moisture, the material is removed from the autoclave and is conveyed through an open aerating conveyor, whereby the greater part of any excess or free water in the hydrated product is expelled as the result of vaporization made possible by the residual heat contained in the product. This aerator is provided with efficient agitators and is also insulated to prevent loss of heat as far as possible. Provisions are also made to carry off the water vapor or steam. The temperature at which the material is discharged into the aerating conveyor may well exceed 350° F., and this temperature is sufficiently high to effect substantially complete removal of excess moisture. It is essential that this moisture be removed even if the product not be ball milled, as otherwise it will tend to take up carbon dioxide from the air and also will get lumpy during storage, as in a warehouse.

Another aspect of the present invention is the further conversion of the hydrated lime into a more acceptable form for utilization by the trade as a finishing lime. Thus, it has been found that the ease of both mixing and application can be considerably improved if the lime coating be plasticized by the elimination of particles of extremely fine size. This plasticizing is in effect a form of agglomeration which is most advantageously effected by subjecting the dry product to rolling attrition, as for example by treatment in a ball mill, tube mill, or rod mill. Thus, the dry, fully hydrated lime is continuously fed into a tube mill, ball mill or rod mill, care being taken that the amount of free moisture in the lime does not exceed 1%, for otherwise the lime will tend to roll up into masses or to become compacted as a hard, dense shell or layer on the interior walls of the mill.

It is preferred to employ a mill having a charge of suitably sized steel balls. It has been found that the quality of the ball milled lime is influenced by the size and weight of the steel balls. In order to impart to the lime the proper soaking and application properties, it is very important that the agglomeration effected by the mill does not lead to agglomerates which are too large in size. It is desirable therefore that the eventual particles are not larger than those which would pass through a 30-mesh screen, for it has been found that any particles which will be retained on a 30-mesh screen will not only tend to lower the plasticity of the product but also will tend to form streaks when the lime is eventually trowelled upon a wall as a finishing coat. The production of a small amount of such particles cannot, of course, be completely avoided, but it is preferred to have no more than 0.3% of a size which would be retained upon a 30-mesh screen. A suitable ball milled lime may have a plasticity of about 300, as measured on an Emley Plasticimeter, and will not form an appreciable amount of streaks when trowelled. On the other hand, a ball milled lime containing from 15 to 20% of flakes larger than 30 mesh will be found to have a plasticity of only about 160 and will tend to streak badly when applied with a trowel.

As an illustration of the importance of the size of the balls used in a mill for producing the improved hydrated lime of the present invention, it may be stated that when employing a tube mill 5 feet in diameter and 22 feet long at a rotational speed of from 20 to 28 R. P. M., the last mentioned type of lime, containing flakes of larger than the optimum size, was produced by using therein about 10 tons of steel balls ½ inch in diameter and 10 tons of steel balls 2 inches in diameter. However, 20 tons of ½-inch balls yield a satisfactory product as to flake size and plasticity. It is desirable, however, to use a mixture of sizes; but if the balls exceed a certain size, the flakes produced are undesirable. About the extreme range of diameter of balls which would still produce a product within the scope of the present invention would be one varying from ¼ inch to 1 inch. Of course, material other than steel may be employed for making the balls; and in determining the dimensions to be used, the relative density of such other material as compared with steel must be taken into consideration. In other words, the force exerted upon the fine lime particles, tending to flake them, is an important consideration. In general, the ratio of pounds of lime treated per hour to pounds of balls in the ball mill should be approximately as 1:2 by weight.

The present invention can, of course, also be applied to lime which has been calcined in a rotary kiln. When employing such a kiln, the stones taken from the quarry may be broken up so as to be about 5 inches in size, and preferably are broken to a size not exceeding 2 or 3 inches. Limestone of these proportions is fed into a revolving rotary kiln suitably fired so as to calcine or burn the material to a condition of "no core." The output of this rotary kiln, after cooling, is then hydrated in the manner already hereinabove described in connection with shaft kiln calcined lime.

If a rotary kiln is not available, it is possible to practice the present invention by employing a shaft kiln which is loaded with limestone varying in size anywhere from 3 to 12 inches, carrying the calcination to a point where the entire product will be free of carbon dioxide, leaving no stone with any core. After discharging the product from the shaft kiln and cooling it, it may be hydrated and further worked up as hereinabove indicated.

It will hence be obvious that the type of calcining instrumentality employed is a matter of choice; and therefore one may employ, for the practice of the present invention, tunnel kilns, rabbled hearth type kilns, muffle furnaces, or any other suitable device which will permit heating of the limestone to a temperature and for a time sufficient to remove therefrom all of the therein contained carbon dioxide.

In using the term "limestone" in the present connection, it is intended thereby to include any type of limestone, whether it contains magnesia or not, and even to include dolomite itself. Furthermore, the purity may be as low as 75% of alkaline earth material. By the term "alkaline earth" it is intended to cover calcium as well as magnesium.

As a further alternative, it is possible to operate the present invention by hydrating the entire output from the kilns at one time in a pressure hydrator, so that the hydration of the easily hydrated CaO, of the more difficultly hydrated CaO, and of the MgO may all be accomplished at one time, using a sufficient quantity of water and steam to insure the hydration of all of the alkaline earth oxides contained in the product. For most commercial purposes, however, the separate hydration of the not overburned portions of the calcium oxide at atmospheric pressure is preferred, as the direct pressure hydration of the entire product produces rather high temperatures and pressures by reason of the rapidity of the reaction of water or steam with the normally burned oxides contained in the calcined material.

In any event, no matter which method of hydration is employed, it is advisable to use no more water than is necessary to convert the alkaline earth oxides into their corresponding hydroxides, and then to aerate the product removed from the pressure hydrator for the purpose of eliminating therefrom any excess uncombined water, as the tube milling of the product when completely dry will yield superior results.

The product produced by the present invention is a highly plastic, high grade finishing lime even though it may have been made from a quarry run of limestone which had not first been carefully sorted and burned under controlled conditions.

When it is considered that in the prior art it was necessary carefully to supervise the calcination and to carry it out with stone of only a carefully preselected size, thus resulting in considerable waste, it can be readily appreciated that the present invention represents a considerable forward step in this art, because it enables the lime manufacturer to utilize the entire output of his quarry.

While most lime was hitherto made from either high calcium or dolomitic stone of not less than 90% purity on the basis of the therein contained oxides, the present process permits the utilization of stone of as low as 75% purity. If such impure stone were burned by the prior art processes, an unsound building lime, for use either as quicklime or as hydrate, would result. The present process, on the other hand, insures the production of a sound lime of unusual plasticity. By the term "soundness" in this connection is meant freedom from expansion, as applied to masonry or concrete units containing lime, and freedom from "pops" and disintegration resulting from expansion when applied as finishing plaster.

It will be appreciated that any process of burning limestone or dolomite, of as low as 65 or 75% purity, to an extent sufficient to eliminate all of the carbon dioxide, will effect a partial or complete fusion of the impurities contained in the lime, thus forming aluminates, silicates, ferrates, and the like. Previously these adventitious admixtures constituted hazards in the successful employment of the products, since these materials tend to hydrolyze or hydrate in the manner of cements, with the attendant changes in value.

It is not deemed necessary in connection with the present invention to state any particular temperature or time conditions, as the conditions necessary to remove all of the carbon dioxide from limestone are well known in the lime burning art, but in general the temperature should be about 1000° F.

Inasmuch as all the apparatus employed in carrying out the present invention is of standard construction, its further description or illustration is deemed superfluous.

It has been found advantageous, in carrying out the present invention, to use certain hydration catalyzing or accelerating agents during the pressure hydration step of the process, not only to insure more complete hydration but to increase the speed thereof, this being particularly true of the MgO content of the calcined material. It has been found that if small amounts of ammonia gas are introduced into the autoclave before or at the time the water or steam is added, the time required for the hydration is noticeably shortened. Other ammonium salts may obviously be used, such as ammonium chloride, which will be decomposed by the lime into the free ammonium hydroxide or ammonia gas, the only disadvantage being that under these conditions calcium chloride will be formed, which has some tendency to effloresce in service. An ammonium salt which may be used for the present purpose is ammonium sulfate, which will react to yield the quite insoluble calcium sulfate; but the introduction of ammonia as a gas or in the form of a solution in water (ammonium hydroxide) is preferable. It is not the intention to limit this invention entirely to the use of free ammonia or ammonia salts, as other accelerating agents may be used, for any compound which tends to increase the solubility of the magnesium oxide or hydroxide will act as a hydration accelerator.

Saving for themselves such equivalents as will occur to those familiar with the art into which this invention falls, applicants claim:

1. Process of producing plastic hydrated lime which comprises burning raw limestone in the form of pieces of fairly widely varying sizes under conditions sufficiently drastic to burn all of said limestone pieces to a condition of absence of unburnt core, thereby also producing some overburnt lime, hydrating the thus produced lime mixture under superatmospheric pressure to insure its substantially complete hydration, reducing the free moisture content of the product thus produced to below 1%, thereby producing a hydrated lime product in the form of a very fine substantially dry powder, and then agglomerating the particles of said powder into aggregations not substantially exceeding 30 mesh in size by ball milling said substantially dry powder with steel balls varying in size within the range of from about ¼" to 1" in diameter.

2. Process of producing plastic hydrated lime which comprises burning raw limestone in the form of pieces of fairly widely varying sizes under conditions sufficiently drastic to burn all of said limestone pieces to a condition of absence of unburnt core, thereby also producing some overburnt lime, hydrating the thus produced lime mixture first at atmospheric pressure to hydrate the normally burnt lime therein and then further hydrating the resulting product under superatmospheric pressure to hydrate the overburnt lime therein, reducing the free moisture content of the product thus produced to below 1% thereby producing a hydrated lime product in the form of a very fine substantially dry powder, and then agglomerating the particles of said powder into aggregations not substantially exceeding 30 mesh in size by ball milling said substantially dry powder with steel balls varying in size within the range of from about ¼" to 1" in diameter, the weight of hydrated lime ball-milled per hour being related to the weight of the steel balls in the ratio of about 1:2.

3. The process of claim 1 in which the limestone is a magnesian or dolomitic limestone.

4. The process of claim 2 in which the limestone is a magnesian or dolomitic limestone.

5. The process of claim 1 in which free ammonia is present during the pressure hydration.

6. The process of claim 2 in which free ammonia is present during the pressure hydration.

7. Process of producing a plastic hydrated lime which comprises ball-milling hydrated lime in a tube mill with balls whose diameter lies within the range of from about ¼ inch to about 1 inch, so as to re-aggregate lime particles of smaller size into aggregations of larger size.

8. Process of producing a plastic hydrated lime which comprises ball-milling pressure hydrated lime in a tube mill with balls whose diameter lies within the range of from about ¼ inch to about 1 inch, so as to reaggregate lime particles of smaller size into aggregations of larger size.

HARRY N. HUNTZICKER.
CHARLES ROBERT NORMAN, Jr.